April 12, 1955 E. W. CARROLL 2,706,030
ARTICLE FEED MEANS
Original Filed June 10, 1949 3 Sheets-Sheet 1

INVENTOR.
ELLSWORTH W. CARROLL
BY Herbert E. Metcalf
His Patent Attorney

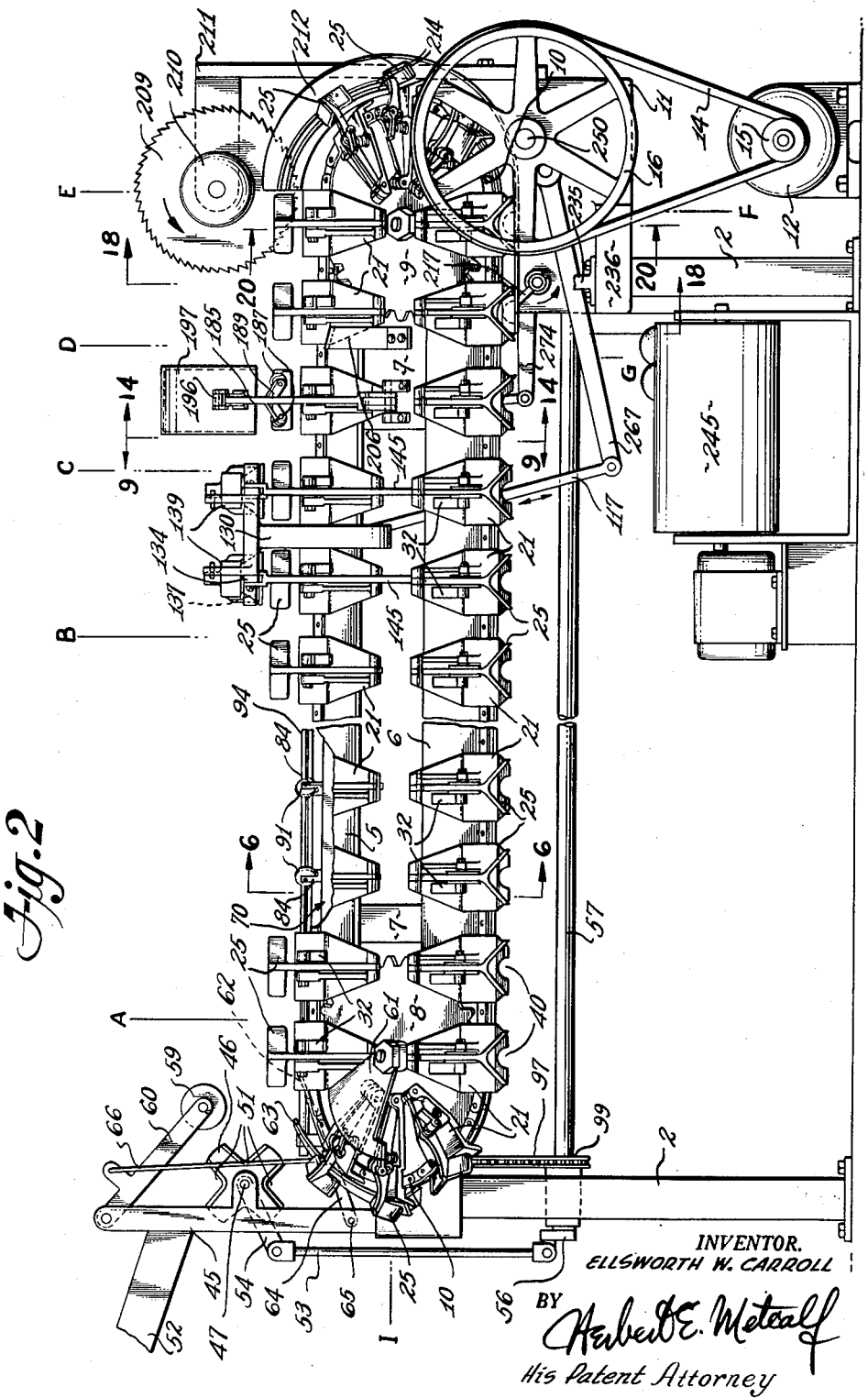

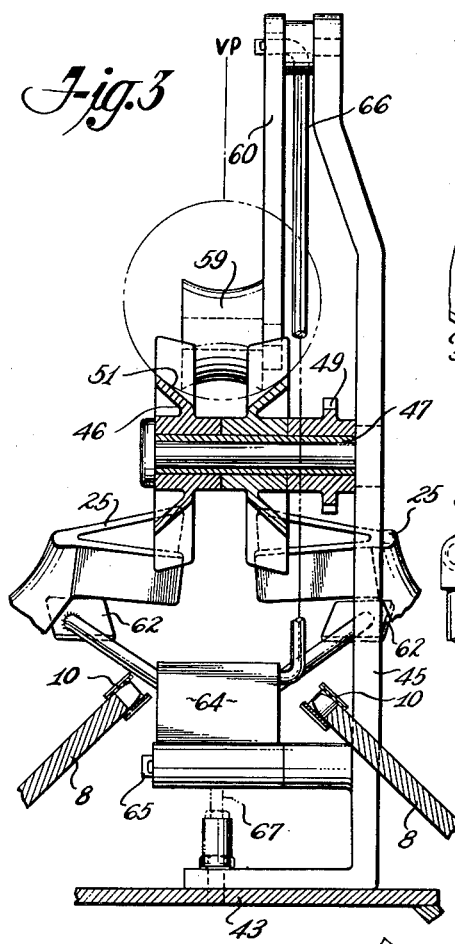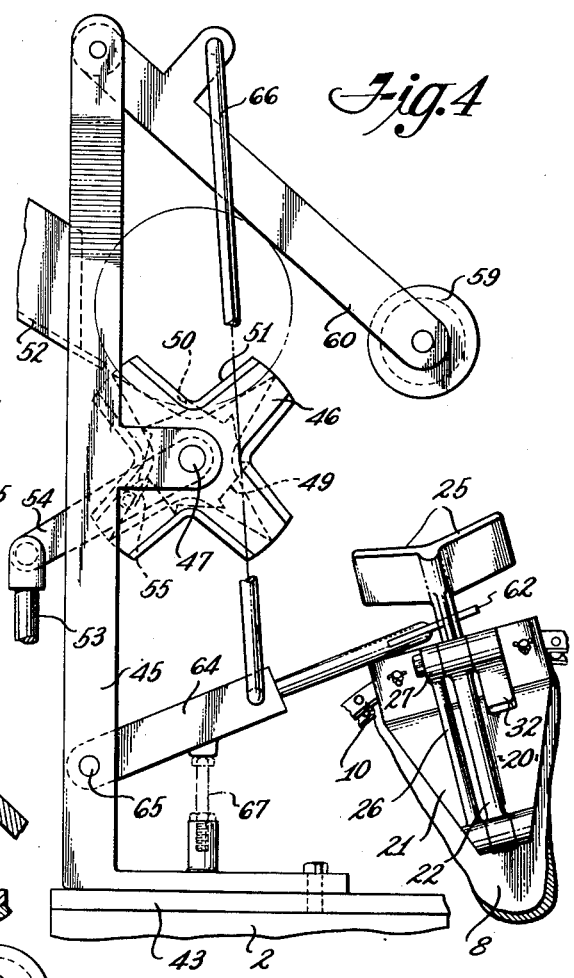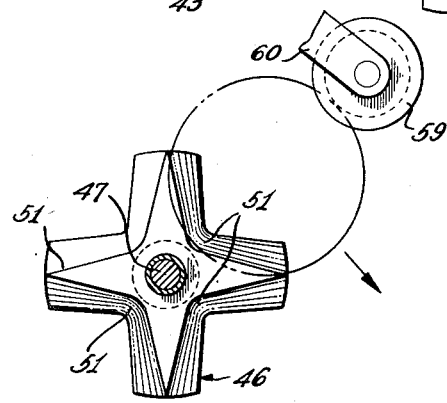

United States Patent Office 2,706,030
Patented Apr. 12, 1955

2,706,030

ARTICLE FEED MEANS

Ellsworth W. Carroll, Redwood City, Calif., assignor to S & W Fine Foods, Inc., San Francisco, Calif., a corporation of California Original application June 10, 1949, Serial No. 98,260. Divided and this application May 11, 1951, Serial No. 225,730

19 Claims. (Cl. 198—33)

This invention relates to apparatus for processing fruit having a stem indent and more particularly the present invention relates to apparatus for feeding, for halving and for pitting peaches and other similarly indented fruit, and particularly peaches suitable for canning, into a peach orientating and pitting machine.

The various features of the present invention are shown and described herein, for purposes of illustration of the means involved, as combined in a unitary machine coordinated to perform continuously the following operation in sequence, entirely automatically, on whole fruit such as peaches:

1. To feed whole peaches in timely relation to the input of the machine in heterogeneous positions.
2. To automatically adjust fruit carriages on the machine to a size related to the size of the peach in the individual carriages.

Among the objects of the present invention are:

To provide a machine coordinated to receive an orderly succession of fruit such as peaches and to automatically feed the fruit in heterogeneous positions into the input of the machine in timely relation to fruit carriages adapted to maintain the fruit in a position to be further operated on during passage through the machine;

To provide a means and method of gaging the fruit as to size as it enters the machine and to automatically adjust the size of the fruit carriages to the size of the individual fruit loaded therein;

And to provide a machine that will efficiently handle either graded for size or ungraded fruit; and To provide these and other objects of the invention as will be apparent from the perusal of the accompanying description of one preferred form of the invention as shown in the drawings in which:

Figure 2 is a side elevational view of the machine of Figure 1.

Figure 3 is a view partly in section, illustrating a loading feature of the aforementioned machine.

Figure 4 is a side elevational view of the loading feature of Figure 3.

Figure 5 is a fragmentary view illustrating a detail of the loading feature of Figures 3 and 4.

Figure 1:
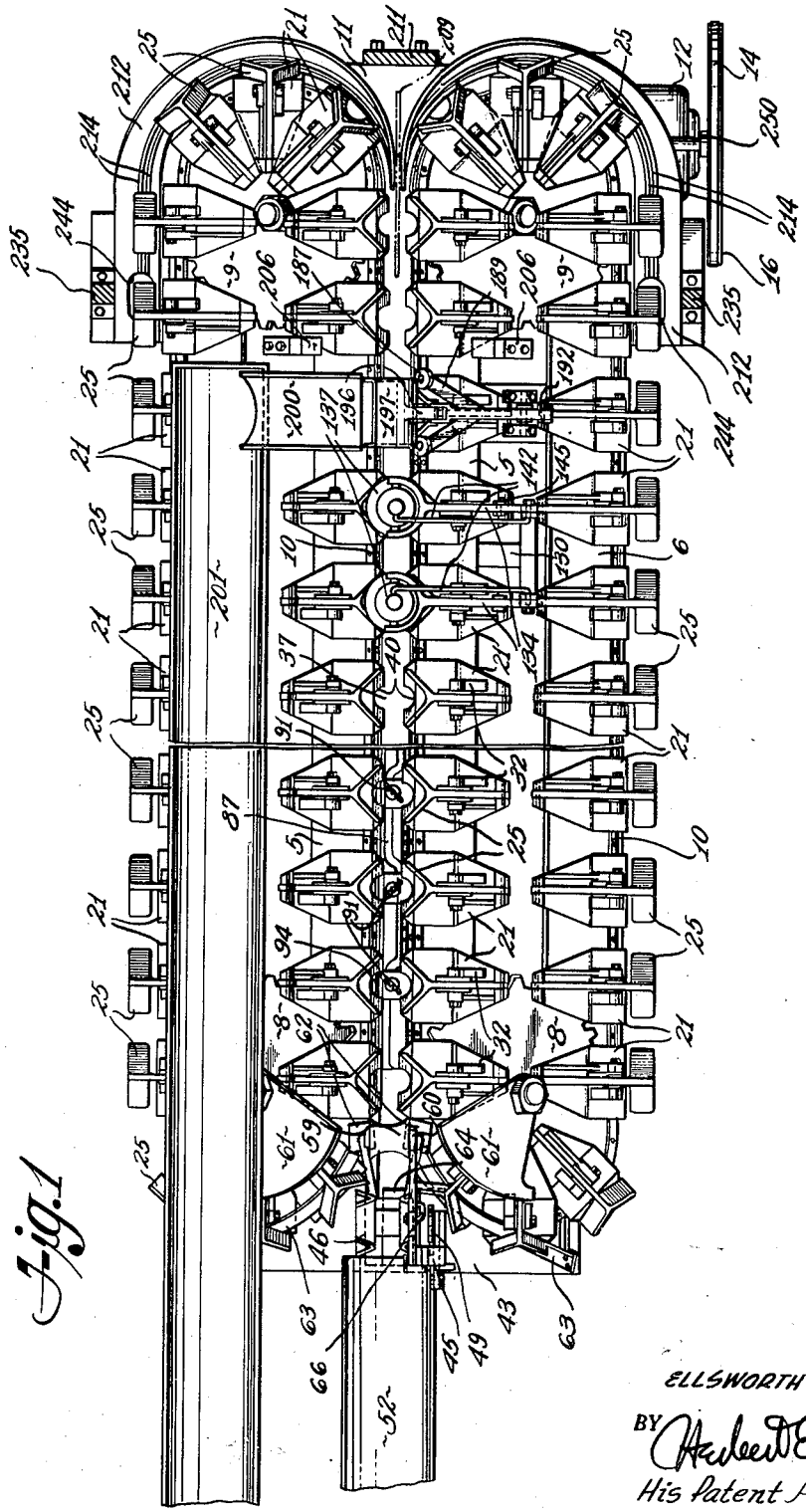
Figure 1 is a plan view illustrating the general relationship of the various features of the machine.

*Main elements and stages of the machine*

Before entering into a description of the details of the various mechanisms utilized in the various stages of the complete machine shown in the drawings, the main elements thereof as particularly shown in Figures 1 and 2 will first be described.

The machine illustrated is of the endless carrier type in which a plurality of fruit carriages are continuously progressed over a frame supported on frame legs 2.

The frame comprises an upper chain bar 5 and a lower chain bar 6 tied together by end crossbars 7 and held at 90° to each other and at 45° to the ground level.

At the ends thereof each chain bar is cut away to receive an idler sprocket 8 at the front end of the machine, and to receive a drive sprocket 9 at the rear end, these sprockets being positioned to guide an endless roller chain 10 in a position to ride along the top edge of each upper chain bar 5 and along the bottom edge of each of the lower chain bars 6. The two drive sprockets 9 are driven from a gear box 11, which is supplied with power from electric motor 12 through belt 14, motor pulley 15 and gear box pulley 16.

A plurality of fruit holding carriages are formed from opposed carriage halves oppositely positioned on and attached at uniform intervals to the roller chains 10, and progressed by them along the chain bars.

The carriage halves are separated as they pass along the lower chain plate 6 and then rise to approach each other as a loading stage I–A is reached prior to progressing horizontally along the top of the upper chain bars 5. The stages are best shown in Figure 2.

At the loading stage I–A the fruit is loaded in proper sequence into the fruit carriages formed by the opposite carriage halves now in position to retain the fruit, and if the fruit being processed is ungraded a fruit carriage sizing means is operated as the fruit is loaded into the carriage. This stage will later be described in detail.

After a peach is loaded into a carriage, the carriages are progressed to enter into an indent orientation stage extending from A to B in which the fruit are revolved by frictional contact with power driven wheels mounted on a subconveyor, so that during the orientation stage the fruit will be rotated at all times except when a wheel registers with the stem indent. This registry prevents further driving contact with the fruit so that the fruit stops rotating, with the indent down. During the passage of fruit through stage A–B the orientation wheels are changed in rotational plane, preferably rapidly, to increase the probability of indent registry with the wheel.

After the wheels are removed from beneath the fruit by termination of the sub-conveyor, the carriages pass through a seam orientation stage B–C. While the fruit is in this stage a member having an indent fitting head is applied to the fruit from below and travels with the fruit, oscillating meanwhile to settle the fruit to its deepest extent on the head and thereby orientate the fruit as to seam or suture plane. As the carriages pass out of the seam orientation stage B–C, the heads return quickly to orientate the following fruit as to seam plane. The fruit then enters an inspection stage C–D.

In this stage C–D, a pilot is inserted into the stem indent, this pilot having a feeler on the upper end thereof sensing the shape of the indent. If the feeler is not operated, due to an improperly orientated indent being presented to it, or due to no indent at all being entered, the fruit is raised by the pilot, and means are provided to remove the peach from the carriage and from the machine. Assuming that the inspection has found a properly orientated fruit to be present in the carriage, the fruit is carried next to a halving stage D–E, the position sensing pilot returning to inspect the fruit in a following carriage.

As the fruit enters the halving stage D–E, the halves of the carriage are released so that the peach is gripped by the carriage halves, and a rotating circular saw cuts through the vertical central plane of the peach as the carriage progresses. When the peaches are properly orientated, the cut is made through the tip-indent axis and in the plane of the seam, thus providing substantially identical fruit halves.

At the end of the halving stage D–E, the cut surfaces of the peach are close together and vertical. The peach halves are then passed into a peach half separation and turning stage E–F, in which the fruit halves are widely separated but are still progressed by the individual carriage halves to a position in which the cut surfaces of the fruit halves are horizontal and facing downwardly. The fruit halves then pass through a pitting stage F–G, during which the cut-out peach pit portions are removed from the half and discharged. The pitted half is then separately discharged and the carriage halves then return along a return stage G–I to rise again and approach each other to receive a whole fruit in the loading stage I–A.

The details of each stage, operating as set forth above, will next be described.

*Fruit carriages*

The details of one form of adjustable carriages are shown in Figures 1, 2, and 4. Each carriage comprises a pair of carriage halves 20 attached to chains 10 opposite each other. Each carriage half 20 comprises a flat carriage plate 21 attached at one end to roller chain 10 to slide over upper and lower chain bars on the outside edges thereof. At the other end of the carriage plate 21, a central ribbed arm 22 extends upwardly from a pivot pin 24 on carriage plate 21 to terminate in a V-shaped pair of fruit restraining fingers 25 extending substantially horizontally when the carriage base plate 21 is on an upper chain bar. Also extending upwardly from the bottom of carriage plate 21 is a solid arm 26 terminating in an enlarged end 27 from which a locking screw 29 is extended horizontally fore and aft to pass through an arcuate slot 30 in central ribbed arm 22. Locking screw 29 has a threaded end screwed into enlarged end 27 of solid arm 22 and outside of slot 30 the screw 29 is provided with a locking lever 32. The relationship of locking lever 32, ribbed arm 22, and solid arm 25 is such that upward pressure exerted by a locking spring 34 bearing against locking lever and carriage plate 21, and held in place by a plate boss 35 and a lever boss 36, causes the ribbed arm 22 to be firmly locked to the solid arm 26. The threads on screw 29 are coarse, so that a very slight downward movement of the end of locking lever 32 will unlock ribbed arm 22. When pressure on lever 32 is released, spring 34 will relock the ribbed arm 22. The weight of the fruit is such that when the ribbed arm is unlocked, the arm and fingers will fall toward the carriage plate by gravity. When two half carriages are opposed to hold a fruit therebetween, the width of the space between the opposed finger pairs can be changed, and the arms locked in any position desired. Thus, fruit differing materially in size can be accommodated between opposed finger pairs, with proper spacing so that fruit between the finger pairs can be freely revolved.

The space between finger pairs 25 during passage of the fruit along the machine will be termed a fruit restraining space 37.

The restraint of the fruit from below is provided by a base plate 39 extended from each carriage plate 21 toward the vertical longitudinal central plane of the machine V. P. These base plates 39 are substantially horizontally positioned beneath finger pairs 25 and are centrally provided with central cut out portions 40 for the insertion of various devices from below into the restraint space 37 above opposed base plates.

As will be seen later, the control of the size of the restraint space 37 between carriage halves can be made automatic, either for running graded peaches where the restraint space is kept uniform in size except for a gripping of the peach just prior to sawing; or for running ungraded peaches where the position of the finger pairs in each carriage half of a carriage assembly is individually changed to provide the proper size of restraint space for free revolution of a peach being loaded into the particular restraint space.

*Loading stage K–A*

Loading of the peaches is accomplished by the mechanism particularly shown in Figures 3, 4, and 5, taken in conjunction with Figures 1 and 2.

An upright 45 is erected from a frame plate 43 joining legs 2 at the input end of the machine, and carries a star wheel 46 rotatable in the central vertical plane V. P. on wheel pin 47. Attached to star wheel 46 is a ratchet 49 having eight teeth 50 thereon. The star wheel 46 has four pockets 51 and is placed at the end of a sloping feed chute 52 in which the peaches to be run are stacked, the chute being fed from a hopper (not shown) with the fruit in heterogeneous positions as to indent.

The star wheel 46 is rotated by reciprocation of a pawl lever 54 having a pawl 55 mounted thereon engaging teeth 50 on the ratchet 49. Lever 54 is reciprocated through rod 53 by crank 56 (Figure 2) mounted on the end of a lower longitudinal shaft 57 extending forward from gear box 11 at twice machine cycle speed so that a peach rolling from feed chute 52 into a star wheel pocket 51 will be rotated first, one eighth of a revolution to a position in contact with an upper dished roller 59 mounted on a swinging roller arm 60 attached to the top of upright 45, this position being shown in Figure 5, and then by another eighth revolution to a position where the fruit will drop by gravity from the star wheel 46 into the restraint space 37 formed by the opposed finger 25 pairs on carriage halves 20 coming up on the chains 10 to the beginning of the horizontal path on the machine frame.

As the carriage halves 20 rise vertically at the input end of the machine, these halves are preferably automatically and individually adjusted for the size peach being loaded when ungraded fruit is being processed.

These carriage halves are first unlocked by a loading cam 61 positioned on each side of the input end of the machine bearing against locking levers 32 on each carriage half shown in Figures 1 and 2. The carriage halves are held unlocked by the loading cam as they rise toward the loading location. As pointed out in the prior description of the carriage halves 20, the restraining finger pairs 25 on each carriage half will fall toward each other by gravity when the ribbed arms are unlocked so that as these carriage halves near the loading position they will have minimum spacing between opposed finger pairs. As the carriage halves 20 rise, in unlocked condition, they are opened to a maximum extent by a fixed opening cam 63.

Just prior to the loading position the distance between finger pairs is controlled by the position of a pair of opposite adjusting cams 62 which begin as opening cams 63 end. Each cam 62 is positioned to bear against a lower and inner surface of a ribbed arm 22 on a carriage half after the ribbed arms leave the opening cams 63. Both adjusting cams 62 are supported by a cam lever 64 pivoted on pin 65 on the lower portion of upright 45. The ribbed arms 22 of the carriage halves, it has been seen, are not vertical, but slope upwardly toward the central vertical plane V. P. of the machine and when released by opening cams 63, come to rest on adjusting cams 62. The vertical position of adjusting cams 62 is determined by a rod connection 66 between cam lever 64 and dished roller arm 60.

As the dished roller arm 60 is lifted to pass over a peach rotated by star wheel 46, this arm 60, through rod connection 66 and cam lever 64 lifts adjusting cams 62 which in turn position the opposed finger pairs 25 on the carriage halves as they leave the opening cams 63 the proper distance apart for the size of the peach about to be loaded. As the carriage halves are about to leave adjusting cams 62, the loading cams 61 (Figures 1 and 2) terminate, and the springs 34 on the carriage halves operating on loading levers 32 lock the finger pairs in the position in which they were placed by the action of adjusting cams 62.

In case graded peaches are being run through the machine, rod connection 66 may be removed and the adjusting cams 62 held in the same position for all carriages by setting a cam lever positioning screw 67 to hold the adjusting cams 62 in a constant fixed position as determined by the average size of the peaches being processed. For ungraded peaches positioning screw 67 can be set to hold the restraint space to a predetermined minimum, or removed, if desired. Thus, the carriages can all be adjusted to have the same restraining space, or can be individually adjusted as to restraint space in accordance with the size of the peach being loaded.

From the above description it will be apparent that there is thus provided a device of the character described possessing the particular features of advantage before enumerated as desirable, but which obviously is susceptible of modification in its form proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is, therefore, claimed in any of its forms or modifications within the legitimate and valid scope of the appended claims.

This application is a division of my pending application Serial No. 98,260, filed June 10, 1949, and entitled Fruit Orientation Device, since matured into U. S. Patent No. 2,568,947, dated September 25, 1951.

I claim:

1. In a fruit processing machine, a carrier, a plurality of fruit retaining carriages mounted on said carrier, means for moving said carrier to progress said carriages past a fruit loading position, means for loading a single fruit into each carriage, and means operated by a fruit being loaded for controlling the size of the carriage being loaded to dimensions larger by a constant value than the fruit being loaded.

2. In a fruit processing machine, a carrier, a plurality of fruit retaining carriages mounted on said carrier, means for moving said carrier to progress said carriages past a fruit loading position, means for loading a single fruit into each carriage, means for gaging the size of a fruit loaded, and means for adjusting the size of the carriage being loaded in accordance with the response of said gaging means.

3. In a fruit processing machine, a carrier, a plurality of fruit retaining carriages mounted on said carrier, said carriages having spaced lateral fruit retaining members, and lower fruit supporting members, means for mounting said lateral fruit restraining members for lateral movement, a wheel having fruit retaining recesses therein, means for rotating said wheel, means for loading fruit into said recesses, means for moving said carrier to progress said carriages in synchronism with rotation of said wheel past a point where fruit drops out of said recesses by gravity to load each of said carriages with a single fruit, a fruit gaging member positioned to contact a surface of said fruit opposite its radial contact with said wheel, and controlling means operated by said gaging member for controlling the lateral spacing of said lateral fruit restraining members.

4. In a fruit processing machine, a carrier, a plurality of fruit retaining carriages mounted on said carrier, said carriages having spaced lateral fruit retaining members, and lower fruit supporting members, means for mounting said lateral fruit restraining members for lateral movement, a wheel having fruit retaining recesses therein, means for rotating said wheel, means for loading fruit into said recesses, means for moving said carrier to progress said carriages past a point where fruit drops out of said recesses by gravity to load each of said carriages with a single fruit, a fruit gaging member positioned to contact a surface of said fruit, opposite its radial contact with said wheel, controlling means operated by said gaging member for controlling the lateral spacing of said lateral fruit restraining members, and a linkage between each lateral fruit restraining member and an associated lower fruit supporting member for changing the vertical position of said lower fruit supporting member in accordance with the lateral spacing of said lateral fruit restraining member.

5. Apparatus in accordance with claim 3 wherein means are provided to automatically lock said lateral fruit restraining members in the lateral spacing as determined by said controlling means after said gaging member has contacted said fruit.

6. Apparatus in accordance with claim 3 wherein means are provided to lock said lateral restraining members in any lateral position, means for unlocking said lateral fruit restraining members prior to the contact of said gaging member with said fruit, and means for locking said lateral fruit restraining members in the lateral spacing as determined by said controlling means after said gaging member has contacted said fruit.

7. Apparatus in accordance with claim 1 wherein the size of said carriages is controlled to permit fruit retained therein to be revolved freely in said carriages.

8. Apparatus in accordance with claim 3 wherein the spacing of said lateral fruit restraining members is controlled by said gaging member to a size permitting fruit to be revolved freely therebetween.

9. A fruit carriage for a fruit processing machine comprising a pair of oppositely disposable sections each having a hinge support on one end and at its other end terminating in an angularly related base adapted for cooperation with the base of the other base section to provide a fruit support, a fruit restraining element for each section, said fruit restraining element including an arm hinged at one end to the hinge support of its associated section and at its other end, terminating in V-shaped fingers above its associated base and adapted to cooperate with oppositely disposed V-shaped fingers to form a substantial enclosure about a fruit on said fruit support, and means for adjusting the spacing between such oppositely disposed fingers to vary the effective size of such carriage, said means including a bolt supported from each section and passing through a slot in its associated arm to permit of the raising and lowering of said arm, said bolt having an exposed end provided with a coarse thread, a locking lever fastened on said bolt, and a spring supported in compression beneath said lever and normally urging the same into frictional locking engagement with said arm.

10. A fruit carriage for a fruit processing machine comprising a pair of oppositely disposable sections each having a hinge support on one end and at its other end terminating in an angularly related base adapted for cooperation with the base of the other base section to provide a fruit support, a fruit restraining element for each section, said fruit restraining element including an arm hinged at one end to the hinge support of its associated section and at its other end, terminating in V-shaped fingers above its associated base and adapted to cooperate with oppositely disposed V-shaped fingers to form a substantial enclosure about a fruit on said fruit support, means for adjusting the spacing between such oppositely disposed fingers to vary the effective size of such carriage, said means including a bolt supported from each section and passing through a slot in its associated arm to permit of the raising and lowering of said arm, said bolt having an exposed end provided with a coarse thread, a locking lever fastened on said bolt, and a spring supported in compression beneath said lever and normally urging the same into frictional locking engagement with said arm, a frame, a pair of endless carrier chains movable along said frame, a plurality of said carriages mounted on said chains and means for progressing said chains along said frame.

11. A fruit carriage for a fruit processing machine comprising a pair of oppositely disposable sections each having a hinge support on one end and at its other end terminating in an angularly related base adapted for cooperation with the base of the other base section to provide a fruit support, a fruit restraining element for each section, said fruit restraining element including an arm hinged at one end to the hinge support of its associated section and at its other end, terminating in V-shaped fingers above its associated base and adapted to cooperate with oppositely disposed V-shaped fingers to form a substantial enclosure about a fruit on said fruit support, means for adjusting the spacing between such oppositely disposed fingers to vary the effective size of such carriage, said means including a bolt supported from each section and passing through a slot in its associated arm to permit of the raising and lowering of said arm, said bolt having an exposed end provided with a coarse thread, a locking lever fastened on said bolt, and a spring supported in compression beneath said lever and normally urging the same into frictional locking engagement with said arm; a frame, a pair of endless carrier chains movable along said frame, a plurality of said carriages mounted on said chains and means for progressing said chains along said frame with said sections at a 45° angle and with said bases and said fingers extending substantially oppositely and horizontally to retain a fruit.

12. In a fruit processing machine, a carrier, a plurality of fruit retaining carriages on said carrier, said carriages having spaced lateral fruit restraining members, means for moving said carrier to progress said carriages past a fruit loading position, means for loading a single fruit into each carriage, and means operated by a fruit being loaded for controlling the lateral spacing of said lateral fruit restraining members to a dimension larger by a constant value than the fruit being loaded.

13. In a fruit processing machine, a carrier, a plurality of fruit retaining carriages on said carrier, said carriages having spaced lateral fruit restraining members, means for moving said carrier to progress said carriages past a fruit loading position, means for loading a single fruit into each carriage, means for gaging the size of a fruit loaded, and means for adjusting the lateral spacing of the lateral fruit restraining members of the carriage loaded in accordance with the response of said gaging means.

14. In a fruit processing machine, a carrier, a plurality of fruit retaining carriages on said carrier, said carriages having spaced lateral fruit restraining members and cooperating lower fruit supporting means, means for moving said carrier to progress said carriages past a fruit loading position, means for loading a single fruit into each carriage, and means operated by a fruit being loaded for controlling the lateral spacing of said fruit restraining members and the vertical position of said lower fruit supporting means, with respect to said carrier.

15. In a fruit processing machine, a carrier, a plurality of fruit carriages mounted on said carrier, said carriages having means forming fruit restraining sides and means forming a carriage bottom, means for progressing said carrier to move said carriages past a fruit loading position, means for loading a single fruit into each carriage, and means operated by a fruit being loaded for controlling to a dimension larger than said fruit the relative spacings of said sides and bottom forming means.

16. In a fruit processing machine, a carrier, a plurality of fruit carriages mounted on said carrier, said carriages having means forming fruit restraining sides and means forming a carriage bottom, means for progressing said carrier to move said carriages past a fruit loading position, means for loading a single fruit into each carriage, and means operated by a fruit being loaded for controlling the relative spacings of said sides and bottom forming means, the vertical position of said bottom forming means relative to said carrier.

17. In a fruit processing machine, a carrier, a plurality of fruit carriages mounted on said carrier, said carriages having means forming lateral fruit restraining sides, and means forming a bottom for said carriage, an element projecting upwardly from said carrier and through said bottom forming means and terminating within said carriage, means for loading a single fruit into each carriage, and means operated by a fruit being loaded for controlling the vertical position of said carriage bottom forming means relating to the termination position of said element within said carriage.

18. Apparatus in accordance with claim 17 wherein said means operated by a fruit being loaded also is connected to control the lateral spacing of said means forming lateral fruit restraining sides.

19. In a fruit orientating machine, a fruit retaining carriage, said carriage having special lateral fruit restraining members mounted for relative movement to open and closed position, a fruit orientating wheel mounted for rotation below said members to contact and rotate the fruit when said fruit is loosely confined within said members, means for feeding fruit to said members, means for measuring the sizes of fruits fed to said members, and means for moving said fruit restraining members to various spaced apart open positions depending on the sizes of fruits measured by said measuring means, to provide a uniform clearance between the fruit and the fruit restraining members during rotation of the fruit by said wheel.

References Cited in the file of this patent

UNITED STATES PATENTS

| | | |
|---|---|---|
| 2,429,346 | Dunn | Oct. 21, 1947 |
| 2,500,648 | Sunseri | Mar. 14, 1950 |